US008307406B1

(12) United States Patent
Aboujaoude et al.

(10) Patent No.: US 8,307,406 B1
(45) Date of Patent: Nov. 6, 2012

(54) DATABASE APPLICATION SECURITY

(75) Inventors: Roger Aboujaoude, Ocean Township, NJ (US); Hossein Eslambolchi, Los Altos Hills, CA (US); John McCanuel, Bailey, CO (US); Michael Morris, Freehold, NJ (US); Saeid Shariati, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1387 days.

(21) Appl. No.: 11/319,182

(22) Filed: Dec. 28, 2005

(51) Int. Cl.
*G06F 21/00* (2006.01)
(52) U.S. Cl. ............. 726/2; 726/3; 726/4; 726/5; 726/6; 726/7; 726/8; 726/27; 726/28; 726/29; 726/30; 713/168; 713/169; 713/170; 713/171; 713/172; 713/173; 713/174; 709/225; 709/229
(58) Field of Classification Search .......... 713/168–174, 713/182–186, 202, 155–159; 709/229, 225, 709/217, 219; 726/1–8, 27–30; 707/9–10
See application file for complete search history.

(56) References Cited

U.S. PATENT DOCUMENTS

| | | | |
|---|---|---|---|
| 6,236,996 B1 * | 5/2001 | Bapat et al. ............................ 1/1 |
| 6,275,824 B1 | 8/2001 | O'Flaherty et al. |
| 6,571,245 B2 * | 5/2003 | Huang et al. ........................... 1/1 |
| 6,578,037 B1 | 6/2003 | Wong et al. |
| 6,611,916 B1 | 8/2003 | Cacace-Bailey et al. |
| 6,738,772 B2 | 5/2004 | Regelski et al. |
| 6,751,729 B1 | 6/2004 | Giniger et al. |
| 6,782,260 B2 * | 8/2004 | Nakakita et al. ............ 455/435.1 |
| 6,820,082 B1 | 11/2004 | Cook et al. |
| 6,823,462 B1 | 11/2004 | Cheng et al. |
| 6,839,843 B1 | 1/2005 | Bacha et al. |
| 6,845,387 B1 | 1/2005 | Prestas et al. |
| 6,892,300 B2 | 5/2005 | Carroll et al. |
| 6,934,706 B1 | 8/2005 | Mancuso et al. |
| 6,938,015 B2 | 8/2005 | Joshi et al. |
| 6,950,943 B1 | 9/2005 | Bacha et al. |
| 6,950,944 B2 | 9/2005 | Yager et al. |
| 7,047,563 B1 * | 5/2006 | Weber et al. ....................... 726/17 |
| 7,149,895 B1 * | 12/2006 | Asokan et al. ................. 713/159 |
| 7,665,122 B2 * | 2/2010 | Torii ................................. 726/2 |
| 7,979,658 B2 * | 7/2011 | Obereiner et al. ............. 711/164 |
| 8,103,001 B2 * | 1/2012 | Le Floch et al. .............. 380/239 |
| 2002/0073072 A1 | 6/2002 | Fukumoto |
| 2003/0033526 A1 * | 2/2003 | French et al. .................. 713/168 |
| 2003/0187848 A1 | 10/2003 | Ghukasyan et al. |
| 2003/0225766 A1 | 12/2003 | Furumoto |
| 2004/0044905 A1 | 3/2004 | Heath et al. |
| 2004/0117220 A1 | 6/2004 | Chess et al. |
| 2004/0122792 A1 | 6/2004 | Salazar |
| 2004/0148513 A1 * | 7/2004 | Scott et al. ..................... 713/200 |
| 2004/0260952 A1 | 12/2004 | Newman et al. |
| 2005/0065889 A1 | 3/2005 | Benaloh |

OTHER PUBLICATIONS

Vipin et al., A Multi Way Tree for Token Based Authnetication, 2008 International Conference on Cmoputer Science and Software Engineering.*

* cited by examiner

*Primary Examiner* — Taghi Arani
*Assistant Examiner* — Josnel Jeudy

(57) ABSTRACT

A method allows access to a set of secure databases and database applications over an untrusted network without replicating the secure database. The method involves authenticating a user using a first authentication application. When the user is verified, then the user's credentials are directed to a second authentication application associated with a secure database based on a first set of user settings retrieved for the user. The second authentication application, based on a second set of user settings, grants the user access to the secure database and database applications associated with the secure database.

11 Claims, 3 Drawing Sheets

DATABASE APPLICATION SECURITY

FIELD OF INVENTION

The present invention relates generally to computer network databases and, more particularly, to a method for allowing customized access to a set of secure databases and database applications over an untrusted network without replicating the secure database.

BACKGROUND

Companies often permit users to access secure databases for a variety of purposes over untrusted networks such as the internet. When providing access to a database through an untrusted network, the owner of the database often implements some form of security measures to ensure that its database is not compromised and remains secure. This includes not only restricting the access of the user to entire databases, but also includes restricting a user's access to specific portions of databases through conventional security measures such as tunneling. But, these security measures only restrict the user's access to the data within a secure database and do not control or restrict the applications that are linked with the secure database. A secure database is usually associated with one or more database applications that can access/manipulate the data. Even though a user may be properly restricted to a certain portion of a database, without controls on the applications and the functions within an application that can be accessed by the user, the user may be able to manipulate the data in an unauthorized way.

Also, secure databases that are accessible over an untrusted network are typically first replicated and the replicated copy is made available to users thereby maintaining the integrity of the original database. This approach provides reasonable security if the database copy is made available in a "demilitarized zone" or "DMZ" on separate hardware, software and/or segregated network. However, this approach is very expensive due to the additional hardware, software and production support required to maintain the additional database and to synchronize the DMZ database with the original.

Thus, there is a need for a method for allowing secure access to specific portions of a secure database while also restricting the control of specific database applications associated with those portions of the database without the need to replicate the database and/or data.

SUMMARY OF THE INVENTION

A method allows access to a set of secure databases and database applications over an untrusted network without replicating the secure database. The method involves authenticating a user using a first authentication application. When the user is verified, the user's credentials are directed to a second authentication application associated with a secure database based on a first set of user settings retrieved for the user. The second authentication application, based on a second set of settings associated with the user, grants the user access to a database application associated with the secure database to allow the user to manipulate data in the secure database. The user can be further restricted, according to the second set of user settings, to specific functions within the database application, specific areas in the secure database, and/or certain commands while using the database application.

DETAILED DESCRIPTION

Figure 1:
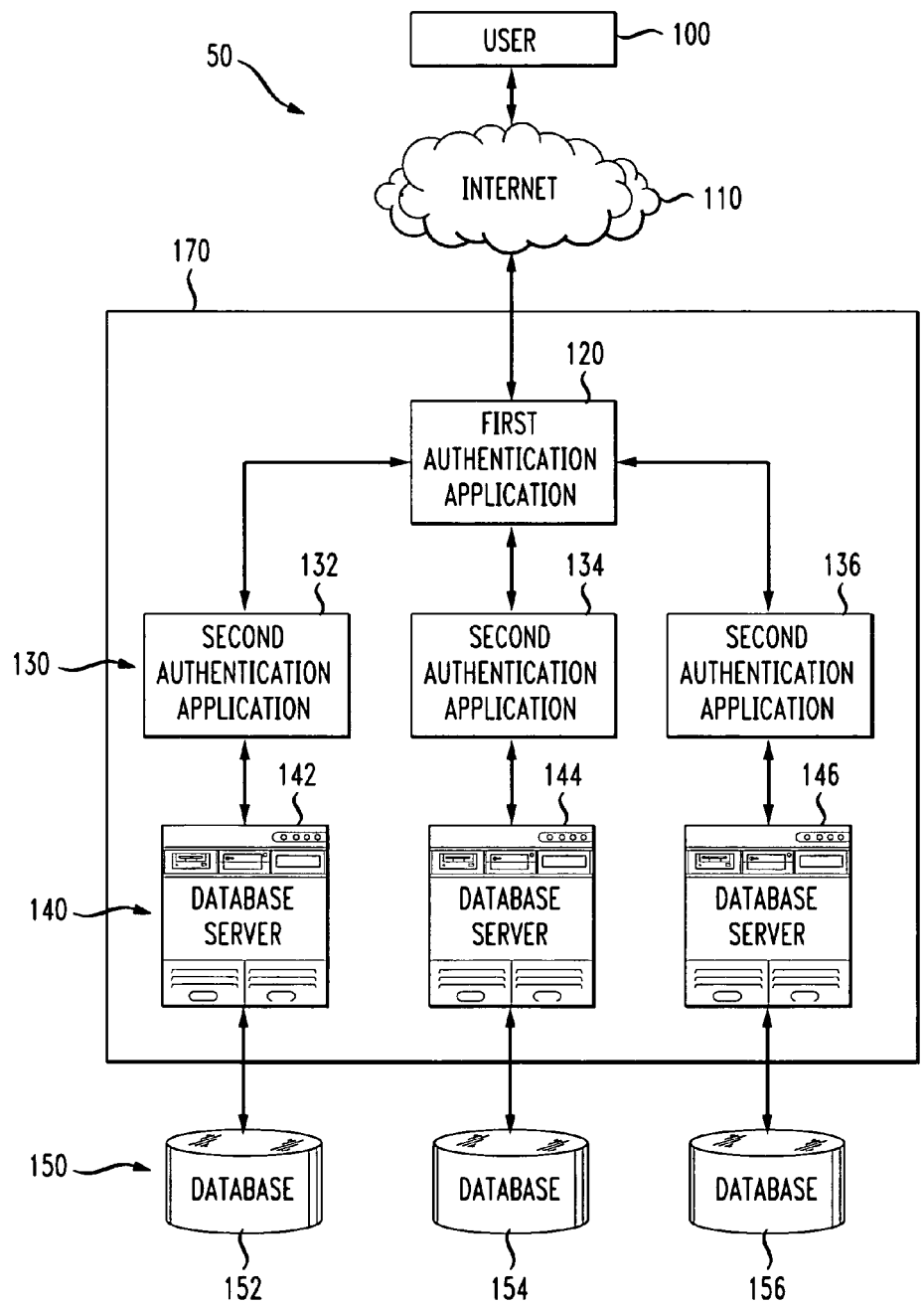
FIG. 1 is a schematic block diagram of an embodiment of the invention.

Referring first to FIG. 1, the system 50 involves the implementation of a sub-network or "demilitarized zone" (DMZ) 170 situated between an untrusted network 110, such as the public interne, and secure databases 150, such as corporate or enterprise databases. In this embodiment, the secure databases 150 are databases that contain original data and are not replicated databases. The DMZ 170 in this embodiment contains a first authentication application 120 as well as second authentication applications 130 that are associated, respectively, with database servers 140 and the secure databases 150.

The first authentication application 120 determines which, if any, of the secure databases 150 the user 100 should be allowed to access based on a first set of user settings. After this threshold authentication has been completed by the first authentication application 120, the credentials of the user 100 are then directed to the appropriate second authentication application 130. The second authentication application further determines, based on a second set of user settings, the portions of the secure databases 150 and database applications executed from the databases servers 140 that are authorized for use by the user 100. Through this authentication process, not only is the user 100 restricted to a specific set of data within the secure databases 150, but the user 100 is also restricted to a specific application and/or application functions based on user settings. The functions of the components of the system 50 are described in detail below.

The database servers 140 utilize security measures, such as tunneling techniques, to maintain a secure connection with the corresponding database. The database servers 140 also execute database applications that process database requests from the user 100 to manipulate information within the secure databases 150. In this embodiment, there are three database servers 142, 144, and 146, that are associated with the secure databases 152, 154, and 156, respectively. In this embodiment, the secure databases 150 are each associated with different database servers 140 and second authentication applications 150 because the secure databases 150 vary widely in their scope, content, and/or operation.

Database server 142, for example, may contain separate software applications for ordering, billing, and inventory using data stored in secure database 152 while database server 144 may contain separate software applications for network status and network maintenance using data stored in secure database 154. In separate embodiments, a database server may be associated with multiple secure databases, rather than a single secure database, that are each associated with specific database applications that are executed from the database server.

The first authentication application 120 is one or more software programs that authenticate a user 100 and retrieve a first set of user settings. The first set of user settings can be stored in a separate database that is accessed by the first authentication application 120 or stored in/with the software for the first authentication application 120. If the user 100 is authenticated in a conventional manner using credentials and/or identifiers such as a username and password, the first authentication application 120 retrieves the first set of user settings associated with the user 100. The first set of user settings includes information that the first authentication application 120 uses to direct the credentials of the user 100 to at least one of the second authentication applications 132, 134, or 136. For example, the first user settings may indicate that, if a user 100 is authenticated, that the user 100 should be granted access to only the second authentication application 134 in order to access data from secure database 154.

Each of the second authentication applications 130 is one or more software programs that restrict the user 100 based on a second set of user settings. In this embodiment, each of the second authentication applications 132, 134, and 136 are associated with one of the secure databases 152, 154, and 156, respectively. The second set of user settings can be stored in a separate database that is accessed by the second authentication application 120 or stored in/with the software that makes up the second authentication application 120. The second set of user settings associated with the user 100 contain information which indicate the portions of a secure database that can be accessed by the user 100 and which database application on a database server can be accessed by the user 100. The second set of user settings is retrieved based on the credentials of the user 100.

For example, if a user 100 is a finance manager seeking access to information in the secure databases 150, the first authentication application 120 will first authenticate the user 100. If properly authenticated, the first authentication application will retrieve the first set of user settings associated with the user 100 and will use those settings to associate the user with the appropriate secure database and second authentication application. If the first user settings indicate that the finance manager should be given access to financial information for his company that is stored only on secure database 156, the credentials of the user 100 will be forwarded to the second authentication application 136 which is associated with secure database 156. The second authentication application 136 will restrict the user 100 to the portion(s) of the secure database 156 that is relevant to the user 100 based on a second set of user settings retrieved for the user 100. The second authentication application will also restrict the user 100 to a database application contained on database server 146, also associated with secure database 156, based on the second set of user settings. The second set of user settings can also specify functions within the database application that the user 100 is allowed to utilize. If specified in the second set of user settings, the user 100 can be granted access to more than one database application and to multiple functions within those database applications.

Although in this embodiment, the second authentication application was depicted as separate from the database server, in alternative embodiments, the second authentication application can be integrated into the database server. Each of the second authentication applications can also be configured to authenticate the user in a conventional manner in addition to authenticating the user for certain portions of a database and specific database application functions.

In separate embodiments, the first and second set of user settings can be stored in the same database and/or combined into a single set of user settings that are passed from the first authentication application to the second authentication application. In other embodiments, the first and second set of user settings can also be generic access rights given to groups of users with similar database needs. For example, accountants from a specific company, although having different threshold username and password credentials, may be associated with a single set of first user settings and second user settings used for further authorization and access to the secure databases 150.

In another embodiment, the user, based on the second set of user settings can be allowed to use an application not associated with the secure databases 150 and outside of the DMZ 170 to access the secure databases 150. This access can include reading and writing data to the secure databases 150. The user, if granted this level of access, will be required to write data according to the metadata rules associated with the secure databases 150.

Figure 2:
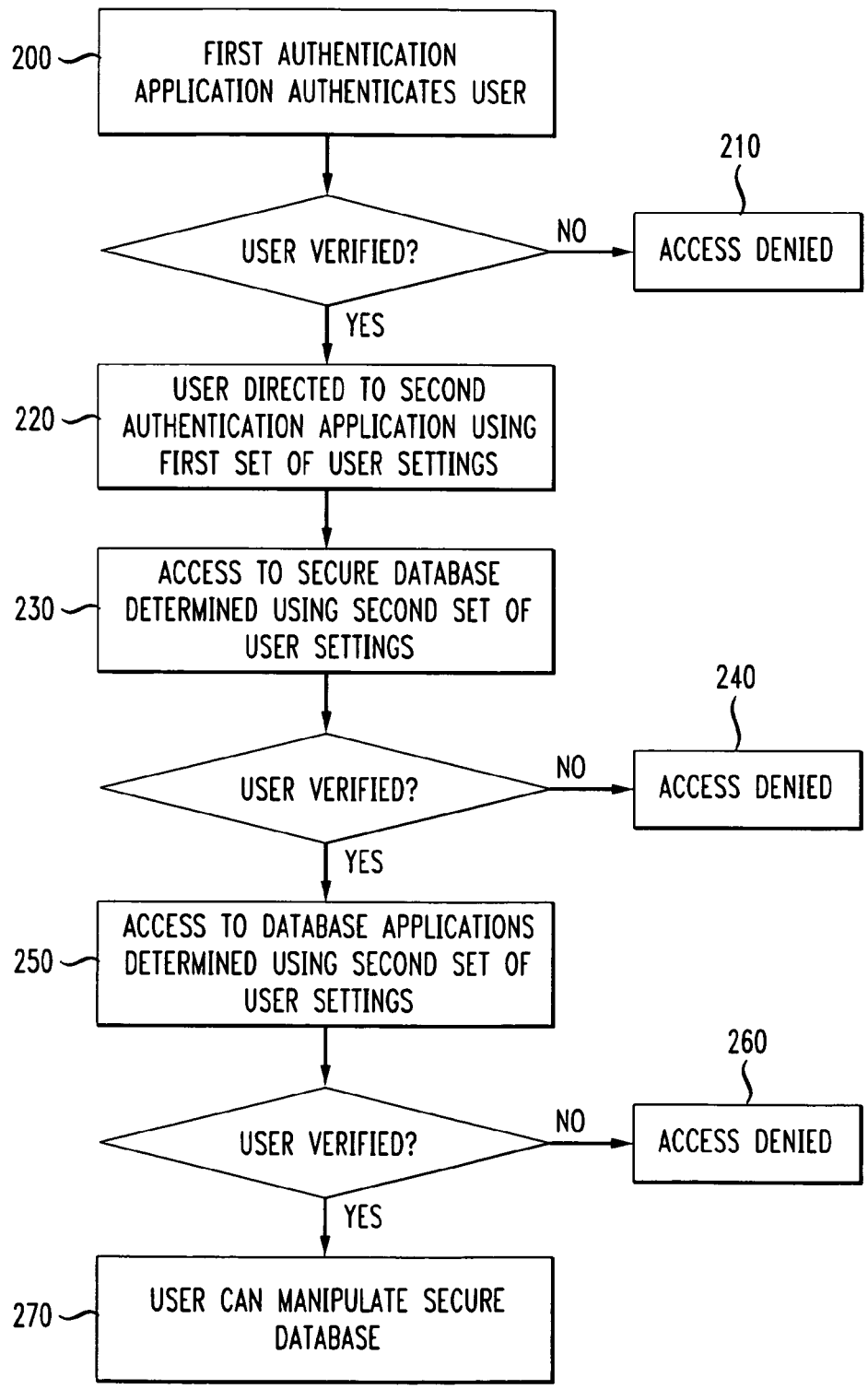
FIG. 2 is a flowchart illustrating an embodiment of the invention.

FIG. 2 is a flowchart that illustrates the process of authenticating and restricting a user to portions of a secure database and functions within a database application intended to manipulate the accessible portions of the secure database. The flowchart shows that a user is first authenticated by a first authentication application 200. If the user is not verified/authenticated, for example, because of an invalid password or username, then the user is denied access 210 to the secure database and database applications. If the user is verified, then the credentials of the user are forwarded to a second authentication application based on a first set of user settings associated with the user 220. The first set of user settings are retrieved based on the credentials of the user.

The information about the user sent from the first authentication application is used to retrieve a second set of user settings associated with the user. The user is then granted access to a specific portion of a secure database according to the second set of user settings or is denied access 240 altogether. If the user is granted access to at least one portion of a database, then the second set of user settings are utilized to determine whether the user should be granted access to specific database application(s) and/or functions within the database application(s) 250. If the user does not have privileges according to the second set of user settings to access the database applications, then the user is denied access 260. If the user has been granted access to the database application(s) and/or specific functions within the database application(s) then the user can manipulate the accessible portion of the secure database 270.

In separate embodiments, the order of the flowchart in the figure can be modified if necessary. For example, the user can be granted access to database applications first and then different portions of the secure database second or can be granted access to the database applications and portions of the secure database simultaneously.

Figure 3:
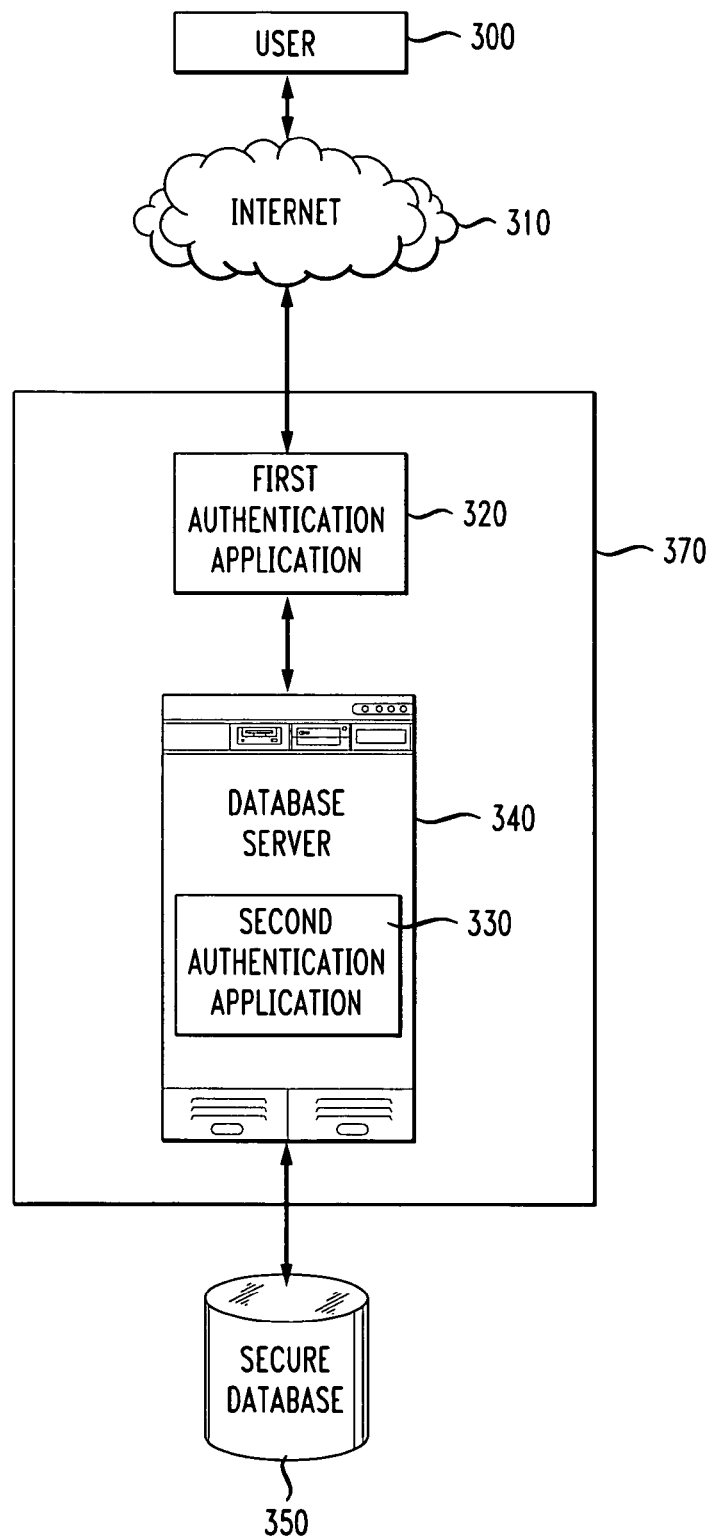
FIG. 3 is a schematic block diagram of an embodiment of the invention.

FIG. 3 is an illustration of an embodiment of the invention where the second authentication application 330 filters the commands from a user 300 in addition to granting the user 300 access to portions of a secure database 350 and functions within a database application. This figure illustrates only one secure database 350, one database server 340, and one second authentication application 330, but in separate embodiments, there can be multiple secure databases and corresponding database servers and second authentication applications.

The first authentication application 320 in this embodiment determines whether the user 300 should be authorized to access the second authentication application 330 based on a first set of user settings. After the threshold authentication has been completed by the first authentication application 320, the credentials of the user 300 are then directed to the appropriate second authentication application 330. The second authentication application further restricts the user's access by determining which portions of the secure database 350 and database application is authorized for use by the user 300 based on a second set of user settings.

After the user is granted access to the database applications and to the appropriate portions of the secure database 350, the second authentication application filters the commands from the user 300 based on commands stored in the second set of user settings. The second set of user settings contain a library of accepted and authenticated database access statements, such as structured query language commands (SQLs) or application program interface commands (APIs), assigned to the user 300. The second authentication application 330 further contains software that compares the commands or requests (access statements) entered by the user 300 to the allowed requests contained in the second set of user settings associated with the user 300. Each time a database request is received through the interne 310, that request is intercepted by the second authentication application 330 and compared against the library contained therein for authentication. Requests not matching the list of allowed commands in the second set of user settings are discarded. The second authentication application confirms that the parameters are authenticated against the requests by the user 300 and that the structure and scope of the request matches acceptable database access statements in the library. If the request matches, the secure database 350 is sent that specific request.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
    authenticating a user using a first authentication application;
    granting the user access to a second authentication application in response to successfully authenticating the user using the first authentication application and based on first settings associated with the user, the second authentication application being associated with a secure database;
    granting using the second authentication application the user access to a database application associated with the secure database, the access of the user to the database application being based on second settings associated with the user, the user being restricted from accessing the second settings, wherein the second authentication application filters database access commands for manipulating the secure database entered by the user based on a list of accepted database access commands included in the second settings associated with the user, wherein the second settings are access rights given to a group of users with similar database needs, wherein the access of the user to the database application is restricted to specific functions within the database application based on the second settings associated with the user; and
    granting the user access to the secure database using the second authentication application, the access of the user to the secure database being based on the second settings associated with the user.

2. The method of claim 1, wherein the access of the user is restricted to a portion of the secure database based on the second settings associated with the user.

3. The method of claim 1, wherein the database application and authentication application are configured to operate on a database server.

4. The method of claim 1, wherein authenticating includes verifying the user using an identification and a password.

5. The method of claim 1, further comprising exposing data accessed from the secure database to the user over an untrusted network.

6. The method of claim 1, wherein the user is denied access to a second database application based on the second settings associated with the user.

7. The method of claim 1, wherein the first settings are settings associated with a group of users.

8. The method of claim 1, wherein the allowing the user to access the secure database includes allowing the user to write directly to the secure database.

9. The method of claim 1, wherein the allowing the user to access the secure database includes allowing the user to access the secure database using an application not associated with the secure database.

10. An apparatus comprising:
    a database hardware server, comprising:
        a first authentication application for authenticating a user and for granting the user access to a second authentication application in response to successfully authenticating the user using the first authentication application and based on first settings associated with the user, the second authentication application being associated with a secure database; and
        a second authentication application for granting the user access to a database application associated with the secure database, the access of the user to the database application being based on second settings associated with the user, the user being restricted from accessing the second settings, for filtering database access commands for manipulating the secure database entered by the user based on a list of accepted database access commands included in the second set of user settings, wherein the second settings are access rights given to a group of users with similar database needs, wherein an access of the user to a selected database application is restricted to specific functions within the selected database application based on the second settings associated with the user, and for granting the user access to the secure database, the access of the user to the secure database being based on the second settings associated with the user.

11. The apparatus of claim 10, wherein the database hardware server is disposed between the user and the secure database.

* * * * *